(12) United States Patent
Lin et al.

(10) Patent No.: US 9,746,744 B1
(45) Date of Patent: Aug. 29, 2017

(54) METHOD FOR FORMING A SELF-ALIGNED MACH-ZEHNDER INTERFEROMETER

(71) Applicant: INPHI CORPORATION, Santa Clara, CA (US)

(72) Inventors: Jie Lin, Santa Clara, CA (US); Masaki Kato, Palo Alto, CA (US); Robb Johnson, Westlake Village, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/609,655

(22) Filed: May 31, 2017

Related U.S. Application Data

(62) Division of application No. 15/261,669, filed on Sep. 9, 2016, now Pat. No. 9,696,604.

(51) Int. Cl.
*G02F 1/225* (2006.01)
*G02B 6/134* (2006.01)
*G02B 6/136* (2006.01)
*G02B 6/12* (2006.01)
*G02F 1/21* (2006.01)

(52) U.S. Cl.
CPC ........... *G02F 1/2257* (2013.01); *G02B 6/134* (2013.01); *G02B 6/136* (2013.01); *G02B 2006/12061* (2013.01); *G02B 2006/12142* (2013.01); *G02B 2006/12173* (2013.01); *G02F 2001/212* (2013.01)

(58) Field of Classification Search
CPC ............... G02F 1/2257; G02F 1/0316; G02F 2001/212; G02B 2006/12142; G02B 2006/12097; G02B 2006/12121; G02B 2006/12061; G02B 2006/12173; G02B 2006/12176; G02B 6/136; G02B 6/134
See application file for complete search history.

(56) References Cited

U.S. PATENT DOCUMENTS

| | | | | |
|---|---|---|---|---|
| 5,757,985 A | * | 5/1998 | Ishizaka | B82Y 20/00 385/1 |
| 8,380,016 B1 | * | 2/2013 | Hochberg | G02F 1/2257 385/131 |
| 8,983,241 B2 | * | 3/2015 | Li | G02B 6/35 359/276 |

(Continued)

*Primary Examiner* — Thomas A Hollweg
*Assistant Examiner* — Mary A El Shammaa
(74) *Attorney, Agent, or Firm* — Richard T. Ogawa; Ogawa P.C.

(57) ABSTRACT

A method of forming a waveguide for a self-aligned Mach-Zehnder-Interferometer. The method includes forming a waveguide on a substrate and providing a first mask with a first opening exposing a first width and a pair of second widths towards opposite sides of the first width. Additionally, the method includes doping a first dopant of a first concentration through the first opening into a first thickness of the waveguide to form a first semiconducting phase thereof. The method includes providing a second mask with a second opening exposing part of the waveguide and doping a second dopant of a second concentration through the second opening into the part of the waveguide to form a second semiconductor phase thereof sharing a boundary with the first semiconducting phase to form a PN junction across the boundary. The boundary is allowed to vary with a margin of tolerance within the first width.

20 Claims, 9 Drawing Sheets

(56) References Cited

U.S. PATENT DOCUMENTS

| | | | | |
|---|---|---|---|---|
| 2007/0237482 A1* | 10/2007 | Hutchinson | ............ | G02B 6/131 385/131 |
| 2010/0080504 A1* | 4/2010 | Shetrit | ............... | G02B 6/12004 385/14 |
| 2010/0098373 A1* | 4/2010 | Hochberg | .............. | H04B 10/70 385/2 |
| 2015/0049978 A1* | 2/2015 | Fujikata | .................. | G02F 1/025 385/3 |
| 2015/0212344 A1* | 7/2015 | Patel | ...................... | G02B 6/132 385/2 |
| 2015/0346520 A1* | 12/2015 | Lee | ......................... | G02F 1/025 385/2 |

* cited by examiner

METHOD FOR FORMING A SELF-ALIGNED MACH-ZEHNDER INTERFEROMETER

This application is a divisional of and claims priority to U.S. application Ser. No. 15/261,669, filed Sep. 9, 2016, commonly assigned and incorporated by reference herein for all purposes.

BACKGROUND OF THE INVENTION

The present invention relates to an electro-optic modulation device and method of manufacture the same. More particularly, the present invention provides an improved process for forming a silicon-based waveguide used as one arm of a Mach-Zehnder Interferometer having a low Vpi PN junction with relaxing misalignment tolerance.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, high data rate communication has been widely implemented via optical network, in which data signals are carried by laser light that is specifically modulated using various kinds of electro-optic modulators. As a key component in the silicon-based photonic integrated circuits for chip-scale high-speed data communication, Mach-Zehnder Interferometer (MZI) based modulator offers high modulation speed and low power consumption. Each MZI is fabricated as a silicon waveguide having at least a PN junction in one optical path which is associated with a characteristic voltage Vpi. Vpi is a voltage required for a MZI modulator to switch from a maximum transmission to a minimum transmission with a π-phase shift. Naturally, a lower Vpi value is desired to reduce driving voltage swing and power consumption of the MZI modulator in the silicon photonic integrated circuits. A width of depletion region of the PN junction directly impacts the value of Vpi. Lowering the width of depletion region can lead to a reduction of the Vpi. In order to fabricate a PN junction of the MZI with narrow depletion region, other than controlling P or N impurity doping profile via implantation, controlling implant mask alignment would be critical. However, convention manufacture methods usually adopt separate N and P implant masks for performing doping process independently in an N region and a P region, which is susceptible to mask misalignment issues. Often, a higher Vpi value is resulted from these process variation and other production issues. For example, a 1V increase of Vpi due to the implant mask alignment variation during manufacture of the PN junction may be accepted, limiting a tolerance margin of error.

BRIEF SUMMARY OF THE INVENTION

The present invention relates to an electro-optic modulation device and method. Various embodiments of the present invention provide a silicon-based Mach-Zehnder interferometer with relaxed process tolerance. More specifically, the invention provides a waveguide adopting self-alignment implant mask for the formation of a PN junction across the waveguide for a Mach-Zehnder interferometer. In certain embodiments, the invention is applied for high-speed electro-optic modulation in silicon-based photonic integrated circuits for chip-scale high speed data communication, though other applications are possible.

In a specific embodiment, the present invention provides a method of forming a waveguide for a self-aligned Mach-Zehnder Interferometer. The method includes forming a waveguide having a length on a substrate. The waveguide includes a first portion having a first thickness and a first width, and a pair of second portions each having a second thickness and a second width naturally extended beyond the first width towards one of two opposite directions. The method further includes providing a first mask with a first opening exposing the waveguide entirely across the first width and the pair of second widths. Additionally, the method includes doping a first electrical dopant of a first concentration through the first opening into the waveguide down to the first thickness of the first portion of the waveguide and the second thickness of each of the pair of second portions to form a first semiconducting phase thereof. The method further includes providing a second mask with a second opening exposing only part of the waveguide including a partial first portion connected to one second portion. The second opening has a same length as the first opening. Furthermore, the method includes doping a second dopant of a second concentration through the second opening into the part of the waveguide down to the first thickness of the partial first portion and the second thickness of the one second portion to form a second semiconductor phase thereof sharing a boundary with the first semiconducting phase. The second dopant is opposite in polarity versus the first dopant. The second concentration is greater than the first concentration. Moreover, the method includes having a partial recombination between the first dopant of the first concentration and the second dopant of the second concentration commonly existed throughout the first thickness of the partial first portion and the second thickness of the one second portion. The method thus includes forming a third semiconducting phase thereof sharing the same boundary with the first semiconducting phase.

In another specific embodiment, the present invention provides a method for manufacturing one arm of a self-aligned Mach-Zehnder modulator. The method includes providing a silicon-on-insulator substrate and forming a first block of a length, a width, and a first thickness in the silicon-on-insulator substrate. The method further includes providing a first mask on the first block. The first mask includes a first opening area exposing the entire width of the first block from a first edge to a second edge. Additionally, the method includes doping a first impurity to a first concentration through the first opening area into the first thickness of the first block to convert the entire first block to be a first semiconducting phase with a first doping polarity. The method further includes providing a second mask on the first block. The second mask has a second opening area overlapping with substantially half of the first opening area having the second edge. The second mask has a boundary edge marginally varied around a central line of the width. Furthermore, the method includes doping a second impurity to a second concentration through the second opening area to convert substantially half portion of the first block to a second semiconductor phase with a second doping polarity opposite to the first doping polarity. The boundary edge is translated to a boundary line between the second semiconductor phase and the first semiconductor phase in remaining half portion of the first block. The method further includes forming an etching mask to cover a first width around the boundary line but to expose a first region and a second region of the first block extended beyond the first width respectively towards the first edge and the second edge. Moreover, the method includes etching partially the first region and the second region to reduce the first thickness thereof to a second thickness while keeping the first thickness within the first width.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1A:
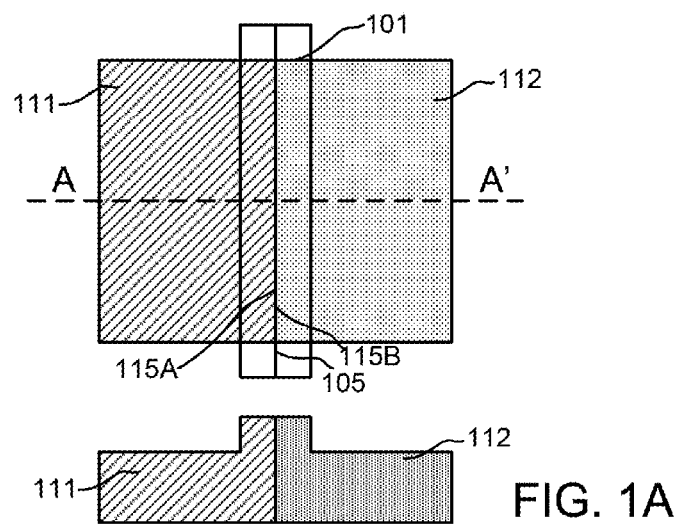
FIG. 1A shows implant masks for forming PN junction associated with a conventional MZI without misalignment of P and N implant regions.

The present invention relates to an electro-optic modulation device and method. Various embodiments of the present invention provide a silicon-based Mach-Zehnder interferometer with relaxed process tolerance. More specifically, the invention provides a waveguide adopting self-alignment implant mask for the formation of a PN junction across the waveguide for a Mach-Zehnder interferometer. In certain embodiments, the invention is applied for high-speed electro-optic modulation in silicon-based photonic integrated circuits for chip-scale high speed data communication, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1B:
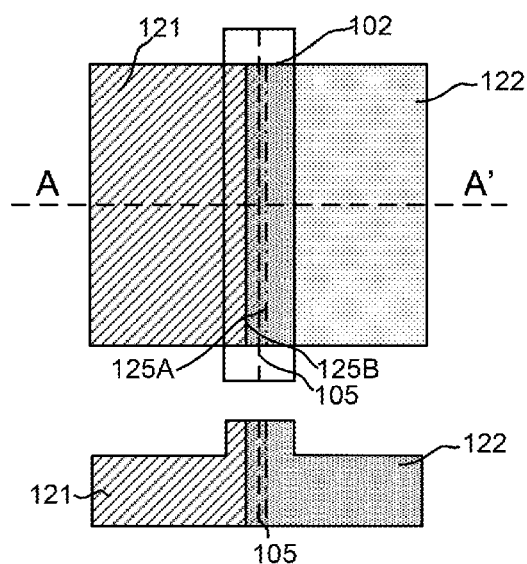
FIG. 1B shows implant masks for forming PN junction associated with a conventional MZI with an overlap between P and N implant regions.
Figure 1C:
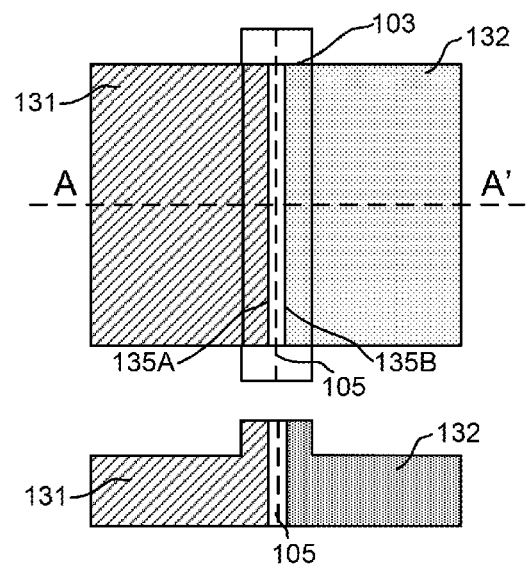
FIG. 1C shows implant masks for forming PN junction associated with a conventional MZI with a gap between P and N implant regions.

FIGS. 1A, 1B, and 1C show an impact of implant mask on depletion region width of PN junction associated with one arm of a conventional MZI with (A) no misalignment of P and N implant masks, (B) an overlap between P and N implant masks, and (C) a gap between P and N implant masks. Typical Mach-Zehnder (MZ) interferometer within the silicon photonic platform includes a silicon-based waveguide 101 associated with two distinct p-type/n-type doping regions 111 and 112 joined together. Optionally, the silicon-based waveguide 101 is a Silicon waveguide. Optionally, it is a Silicon Nitride waveguide, depending on applications of the MZI. Referring to FIG. 1A, the waveguide 101 includes an elevated portion (as seen in the cut view along AA' line) and a lower-step portion for either the p-type doped region 111 or the n-type doped region 112. A conventional manufacture method includes masked implantations to dope p-type/n-type impurity into the corresponding region 111/112. The masking process requires an alignment process to expect a boundary line 115A of the p-type region 111 substantially matching with a boundary line 115B of the n-type region 112. Ideally in a non-misalignment case, both boundaries 115A and 115B are expected to be aligned with a central line 105 of the waveguide 101. As a result of perfect p-n boundary alignment, the PN junction is formed with a normal depletion region of a finite width that is only depended on the p or n-type doping levels thereof.

However, unavoidable variations or errors during the masking process could cause one or more kinds of misalignment in the implant masks. For example, one misalignment of the P and N implant masks causes an overlapped region between the p-type doping region and the n-type doping region. Referring to FIG. 1B, mask misalignment causes a p-type doping region shifted towards right and n-type doping region shifted oppositely toward left so that a p-type doping region 121 overlaps with a n-type doping region 122. The boundary 125A of the p-type doping region 121 is shifted right beyond the central line 105 of the waveguide 102 and the boundary 125B of the n-type region is shifted left beyond the central line 105 towards opposite direction. The overlapped region, of course, has a different and uncontrollable doping level comparing to either the pure p-type or pure n-type regions. Thus, the depletion region of the PN junction will be impacted in width and become uncontrollable due to the PN overlap recombination.

In another example, misalignment of the P and N implant masks causes a gap between the p-type doping region and the n-type doping region. Referring to FIG. 1C, mask misalignment causes a p-type doping region shifted towards left and n-type doping region shifted oppositely toward right so that a gap exists between the p-type doping region 131 and the n-type doping region 132. The boundary 135A of the p-type doping region 131 is shifted left and the boundary 135B of the n-type region is shifted right towards opposite direction, leaving a gap in the middle around the central line 105 of the waveguide 103. Similarly, the gap has a different (depended on the original silicon on insulator substrate) doping level comparing to the pure p-type and n-type doping regions. Again, this causes the depletion region of the formed PN junction wider in width due to the gap formation. A width of depletion region of the PN junction directly impacts the Vpi voltage that is for a MZI-based modulator to switch from a maximum transmission state to a minimum transmission state. The overlap between the optical mode and the depletion region deviates from optimum point when the depletion region gets wider or narrower. The deviation directly causes a higher value of the Vpi voltage, which in turns causes higher driving voltage swing and power consumption for the MZI-based modulator in the silicon photonics circuits. In general, the conventional method of using two separate implant masks for forming the PN junction of MZI likely causes a misalignment overlay which is defined as shift of distance of the p/n boundary off from an optimum point that gives the lowest Vpi. The misalignment overlay is unavoidable mainly due to implant mask alignment variation in the conventional process. Tolerance of an acceptable 1V increase of Vpi due to the misalignment overlay may be rather small under the conventional process.

In order to reduce the Vpi voltage, one effective way is to reduce the PN junction depletion region associated with the MZI. In particular, alignment of the implant masks for forming the p-type or n-type doping region needs to be controlled, however, it is hard to avoid the process variation or very expensive by tightening process tolerance window.

In some embodiments of the present disclosure, an improved process is described below to provide overlapped implant masks for forming the p/n-type doping regions with much relaxed tolerance to the process variations yet achieving a self-alignment of the p/n implant masks substantially free on impact of the depletion region.

Figure 2A:
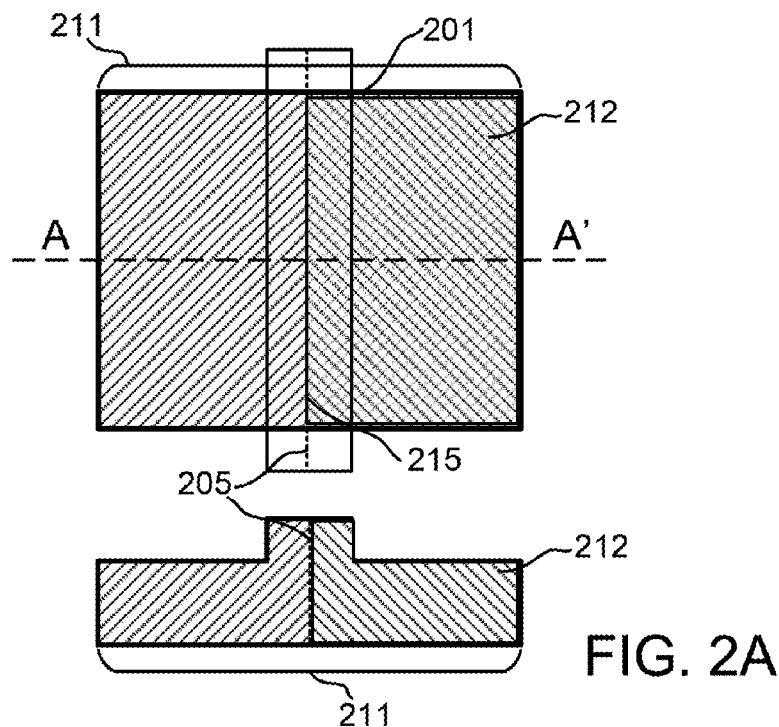
FIGS. 2A and 2B show implant masks for forming a PN junction of a MZI of the present invention in case (A) without misalignment and case (B) with self-aligned P and N implant masks according to some embodiments of the present invention.
Figure 2B:
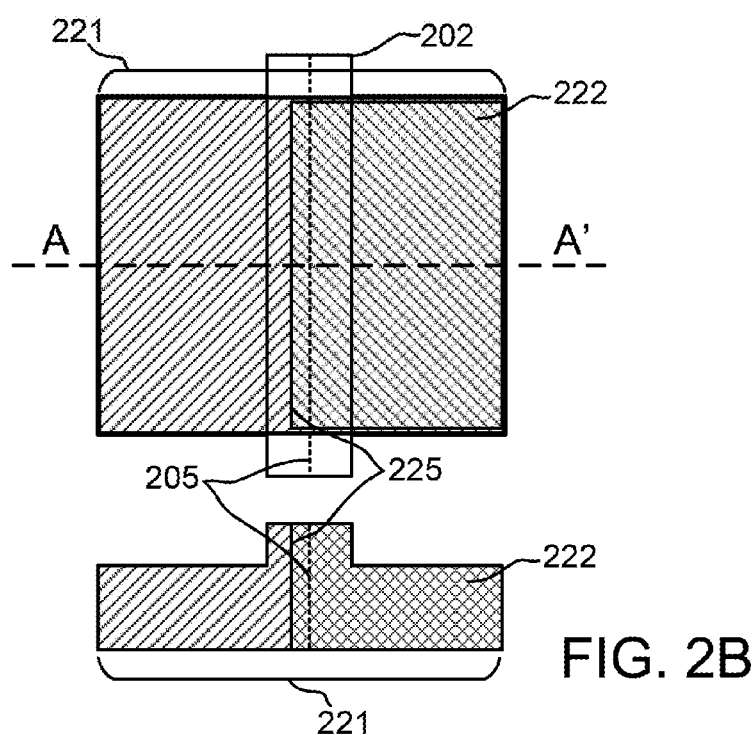

FIGS. 2A and 2B show implant masks for forming a PN junction to one waveguide of a MZI of the present invention in case (A) without misalignment and case (B) with self-aligned P and N implant masks according to some embodiments of the present invention. A top view and a side view of the waveguide with corresponding doping regions with different doping polarities are shown for each case under an improved process with self-alignment in masking. The improved process includes a step to provide a first implant mask with a first opening 211 exposing entire width of the one waveguide 201 for forming a PN junction. The first opening 211 of the first implant mask can be used for performing either p-type doping or n-type doping with a first doping level into a certain thickness of the entire waveguide 201. Another step is performed to form a second implant mask with a second opening 212 of nearly half-size of the first opening 211 exposing a right-side portion (also can be at the left-side portion) of the entire width of the waveguide 201. The second opening 212 has one boundary being set near a central line, with a margin of tolerance, of the first opening 211. The second opening 212 of the second implant mask can be used to perform complementary n-type or p-type doping with a second doping level into the same thickness of the right-side portion of the waveguide.

In general, the dopant type through the second implant mask 212 is opposite in polarity of the dopant type through the first implant mask 211. Optionally, the second doping level is set to be higher, for example, at least twice of, than the first doping level. Since only one boundary is formed between a p-type doping region and a n-type doping region in association with the two above steps of forming the first and second implant masks, alignment is implemented independently even the boundary may be shifted within the margin of tolerance, unlike the conventional process where the implant mask for p-type doping is desired to be perfectly matched with the implant mask for n-type doping.

In an embodiment referring specifically to FIG. 2A, the waveguide 201 has its entire width 211 designated for forming a PN junction along a certain length thereof, which includes a first portion having a first width and a first thickness, the first portion is naturally connected to a pair of second portions respectively extended a second width towards opposite sides of the first portion, and each of the pair of second portions has a second thickness that is smaller than the first thickness, as depicted in a cut view along AA'. A first implantation of a p or n-type impurity is performed to have its total width 211 of the waveguide 201 be doped to form a first semiconducting phase with a first concentration of the p or n-type impurity within the first thickness of the first portion and the second thickness of the second portions. The second implantation is performed to have opposite polarity n or p-type impurity of a second concentration being doped, through the second opening 212, only into a right-side (or left-side) portion of the waveguide 201 which leads to a second semiconducting phase with the second concentration of n or p-type impurity. In the current specific example, without masking misalignment the second opening 212 is disposed such as its mask boundary 215 being substantially coincident with a central line 205 of the waveguide 201.

After performing the second implantation, a partial recombination process occurs for the p or n-type impurities respectively associated with the first and second semiconducting phase in the right-side portion of the waveguide 201. This recombination leads to a formation of a third semiconducting phase with a third concentration of impurity, where the third concentration is the difference between the second concentration and the first concentration. The polarity of the third semiconducting phase should be the same as one of the first or second phase with higher concentration. Optionally, the second concentration is set to be greater than the first concentration. In the end, the third semiconducting phase should have opposite polarity versus the first semiconducting phase. In addition, the third semiconducting phase formed within the right-side portion of the waveguide 201 naturally shares a boundary the same as the mask boundary 215 with the first semiconducting phase in the left-side portion of the waveguide 201. As a result, a PN junction is formed from the right-side to left-side of the waveguide with its depletion region substantially depended only on the doping levels on each side but without being affected by an exact location of the boundary 215, though the boundary 215 in this case is located ideally at the central line 205. The width of depletion region of this PN junction thus can be minimized to achieve lower Vpi voltage for the MZI.

In another embodiment referring to FIG. 2B, the waveguide 202 is substantially similar to the waveguide 201, including a first portion having a first width and a first thickness, the first portion naturally is connected to a pair of second portions respectively extended a second width towards opposite sides of the first portion, and each of the pair of second portions has a second thickness that is smaller than the first thickness, as depicted in a cut view along AA'. Again, a first implantation of a p or n-type impurity is performed to have entire width 221 of the waveguide 202 be doped, through the first opening 221, to form a first semiconducting phase with a first concentration of the p or n-type impurity within the first thickness of the first portion and the second thickness of the second portions. Then a second implantation is performed to have opposite polarity n or p-type impurity of a second concentration being doped, through the second opening 222, only into a right-side (or left-side) portion of the waveguide 202 which leads to a second semiconducting phase with the second concentration of n or p-type impurity. In the current embodiment, the difference of FIG. 2B versus FIG. 2A is that 1) there may be a shift of the first implant mask 221 towards left or right and 2) there is a shift of the boundary 225 of the second implant mask 222 towards left or right so that the boundary 225 is no longer coincident with the central line 205 of the waveguide 202.

After performing the second implantation, a partial recombination process occurs for the p or n-type impurities respectively associated with the first and second semiconducting phase in the right-side portion of the waveguide 202. This recombination leads to a formation of a third semiconducting phase with a third concentration of impurity, where the third concentration is the difference between the second concentration and the first concentration. The polarity of the third semiconducting phase should be the same as one of the first or second phase with higher concentration. Optionally, the second concentration is set to be greater than the first concentration. In the end, the third semiconducting phase should have opposite polarity versus the first semiconducting phase. In addition, the third semiconducting phase formed within the right-side portion of the waveguide 202 naturally shares a boundary the same as the mask boundary 225 with the first semiconducting phase in the left-side portion of the waveguide 202. As mentioned above, the boundary 225 is shifted towards left away from the central line 205. But the boundary shift would not change the nature of that there exist still just one boundary 225, yielding a self-alignment to the doping profile across the boundary 225. As a result, a PN junction is formed from the right-side to left-side of the waveguide with its depletion region substantially depended only on the doping levels on each side but without being affected by an exact location of the boundary 225. The width of depletion region of this PN junction thus can be optimized to achieve lower Vpi voltage for the MZI.

In some embodiments, although the shift of boundary between p and n doping regions does not cause an increase in the width of depletion region under the current process with self-alignment, the shift of boundary between p and n-type doping regions still causes the Vpi voltage value to drop if it is, considered to be a misalignment, too far away from central line of the waveguide 201 (in FIG. 2A) or 202 (in FIG. 2B). Let's still define a misalignment overlay the same as a shift of distance of the p/n boundary off from an optimum point that gives the lowest Vpi. Tolerance of an acceptable 1V increase of Vpi due to the misalignment overlay is substantially enlarged under the current process as depicted in FIGS. 2A and 2B.

In a first specific embodiment, the first implant doping is performed to dope a p-type impurity to a first doping level across entire width of a waveguide under the first opening 211 in FIG. 2A (or 221 in FIG. 2B) of the first implant mask. Then the second implant doping is performed to dope a n-type impurity to a second doping level across only a partial width of the same waveguide under the second opening 212 in FIG. 2A (or 222 in FIG. 2B) which overlaps a (right-side) portion of the first opening 211 (or 221). Optionally, the second opening 212 (or 222) is substantially just half in size of the first opening 211 (or 212) with a boundary 215 (or 225) located near a middle position thereof. The second doping level is designed to be sufficiently higher than the first doping level. Optionally, the second doping level is at least twice greater than the first doping level. After a partial recombination of the doped n-type impurity in the second implant doping with the doped p-type impurity in the first implant doping within the right-side portion under both the first opening 211 (or 221) and the second opening 212 (or 222), a net doping polarity of substantially n-type remains in the right-side portion while the p-type doping characteristic remains in the original left-portion under the first opening 211 (or 221) but excluding the overlapped portion (under the second opening). Thus, a PN junction is formed with a boundary 215 (or 225) from a p-type region on the left-side to an n-type region on the right-side.

In a second specific embodiment, the first implant doping is performed to dope a n-type impurity with a first doping level across entire width of a waveguide under the first opening 211 in FIG. 2A (or 221 in FIG. 2B). Then the second implant doping is performed to dope a p-type impurity with a second doping level across only a partial width of the same waveguide under the second opening 212 in FIG. 2A (or 222 in FIG. 2B) which overlaps a (right-side) portion of the first opening 211 (or 221). Optionally, the second opening 212 (or 222) is substantially just half in size of the first opening 211 (or 212) with a boundary 215 (or 225) at a location varied with a marginal distance around the middle position of the first opening. The second doping level is designed to be sufficiently higher than the first doping level. Optionally, the second doping level is at least twice greater than the first doping level. After a partial recombination of the doped p-type impurity in the second implant doping with the doped n-type impurity in the first implant doping within the overlapped portion under both the first opening 211 (or 221) and the second opening 212 (or 222), a net doping polarity of substantially p-type remains in the right-side portion under the second implant opening while the n-type doping characteristic remains in the original left-portion under the first opening 211 (or 221) but excluding the overlapped portion (under the second opening). Thus, a PN junction is formed with a single boundary 225 from an n-type region on the left-side to a p-type region on the right-side.

Figure 3:
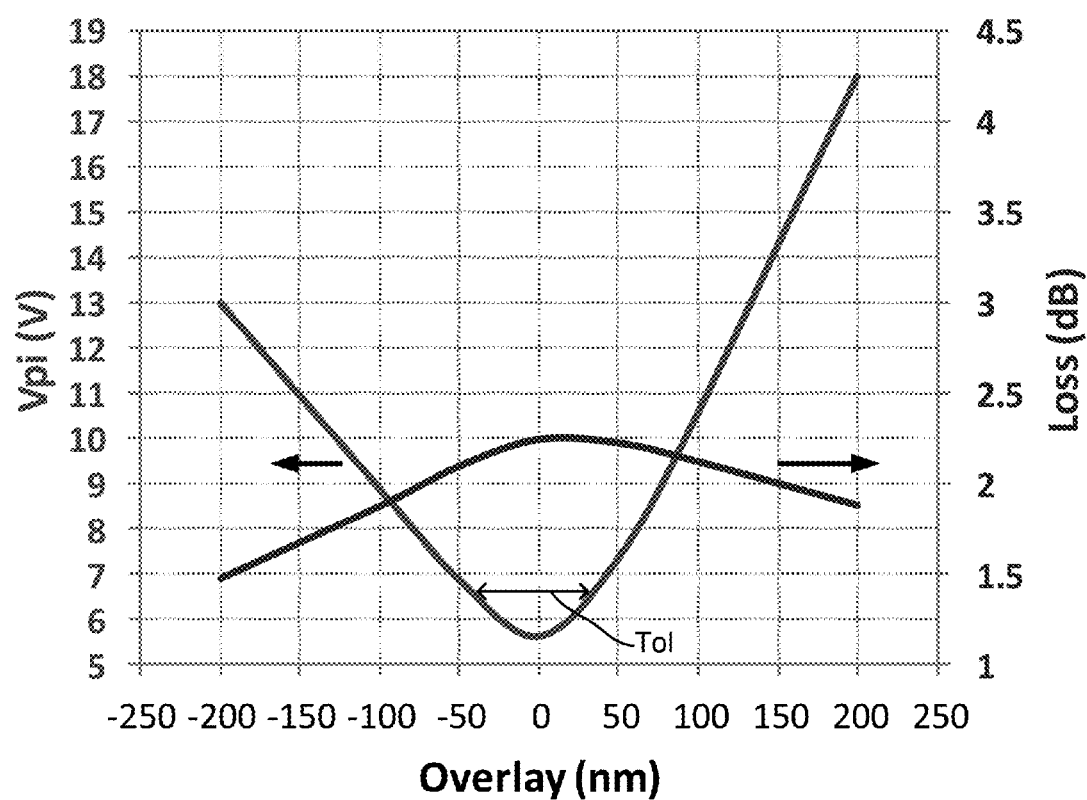
FIG. 3 shows distributions of π-phase shift voltage Vpi and transmission loss of a conventional Mach-Zehnder Interferometer versus misalignment overlay.

FIG. 3 shows distributions of π-phase shift voltage Vpi and transmission loss of a conventional Mach-Zehnder Interferometer versus its alignment overlay. This figure shows poor tolerance of the Vpi value to the alignment overlay due to process variation of a conventional process of applying two implant masks respectively for p-type and p-type semiconducting regions with two boundaries (see FIGS. 1A, 1B, and 1C). The MZI is assumed to be associated with a silicon waveguide of 3 mm in length, 0.45 µm in the first width and 11 µm in entire width across the p and n-type semiconducting region. In current example, the p-type doping level is given as $5 \times 10^{17}$ cm$^{-3}$ and the n-type doping level is also given as $5 \times 10^{17}$ cm$^{-3}$, the misalignment overlay=0 corresponds to a case of perfect alignment of the boundary line with a central line of the waveguide. But, as the overlay increases, the conventional process will lead to a formation of either an overlapped p-n region or a gap between p-type and n-type region, thereby decreasing/increasing a width of depletion region of the PN junction. As a result, Vpi voltage for driving the associated MZI will also increase quickly with increasing of misalignment overlay. As shown, a margin of tolerance (Tol) of the misalignment overlay for having 1V increase in Vpi from its optimum (lowest) value is limited to only 60 nm. When the overlay increases to a value larger than 60 nm, i.e., Vpi will increase more than 1V from its minimum value (~5.6V in the current example). Also shown in this figure, the transmission power loss of the MZI is varied with the misalignment overlay to give 2-2.25 dB within the 60 nm margin of tolerance.

Figure 4:
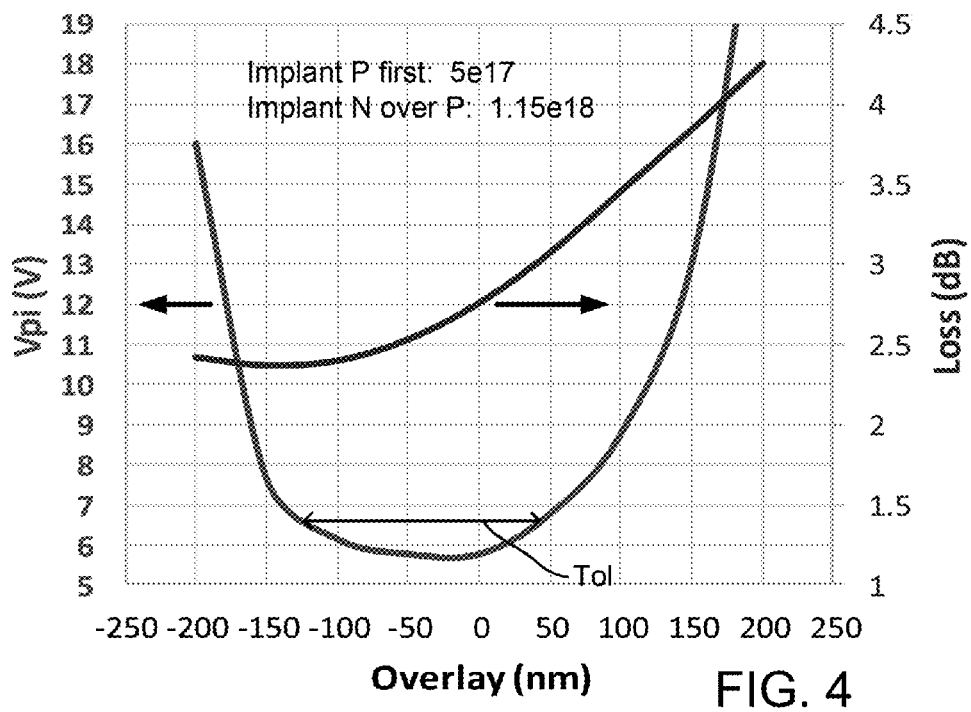
FIG. 4 shows distributions of π-phase shift voltage Vpi and transmission loss of a Mach-Zehnder Interferometer versus misalignment overlay according to a first specific embodiment of the present invention.

FIG. 4 shows distributions of π-phase shift voltage Vpi and transmission loss of a Mach-Zehnder Interferometer versus misalignment overlay according to a first specific embodiment of the present invention. In this example, the MZI has a waveguide arm formed with self-alignment PN junction formed via the improved process of the present disclosure in which two implant masks are applied to form p-type and n-type semiconducting regions with one boundary only (see FIGS. 2A and 2B). Particularly, a p-type semiconducting region at a doping level of $5 \times 10^{17}$ cm$^{-3}$ is formed first across entire waveguide region followed by additionally doping a n-type dopant up to $1.15 \times 10^{18}$ cm$^{-3}$ in a substantially overlapped half portion of the entire waveguide region. With a partial recombination being taken place, a p-type semiconducting region with a doping level of $5 \times 10^{17}$ cm$^{-3}$ is retained in one (non-overlapped) half portion and a n-type semiconducting region with a net doping level of $(1.15 \times 10^{18}$ cm$^{-3}$-$5 \times 10^{17}$ cm$^{-3})$=$6.15 \times 10^{17}$ cm$^{-3}$ is formed in the overlapped half portion sharing just a single boundary. This figure shows measurement of π-phase shift voltage Vpi and transmission loss of a Mach-Zehnder Interferometer against the variations of misalignment overlay from about −200 nm to about 180 nm. In this example, the doping levels for the p-type and net n-type are not equal (opposite in polarity) and the Vpi is depended on actual depletion region of PN junction which is affected by unbalanced doping level. Thus, the minimum Vpi now corresponds to a non-zero value of the overlay with the p-n boundary being shifted towards lower-doping-level side relative to the central line. But under the improved process, the margin of tolerance (Tol), regarding the PN junction boundary and depletion width, is apparently 3 times larger than the case shown in FIG. 3 up to 180 nm. As shown, the Vpi is at its lowest value of 5.7V around −10 nm for the misalignment overlay. Also note, the distribution of MZI transmission loss is tilted toward left and the loss increases very fast even within the margin of tolerance for Vpi especially when the misalignment overlay increases more in positive direction.

Figure 5:
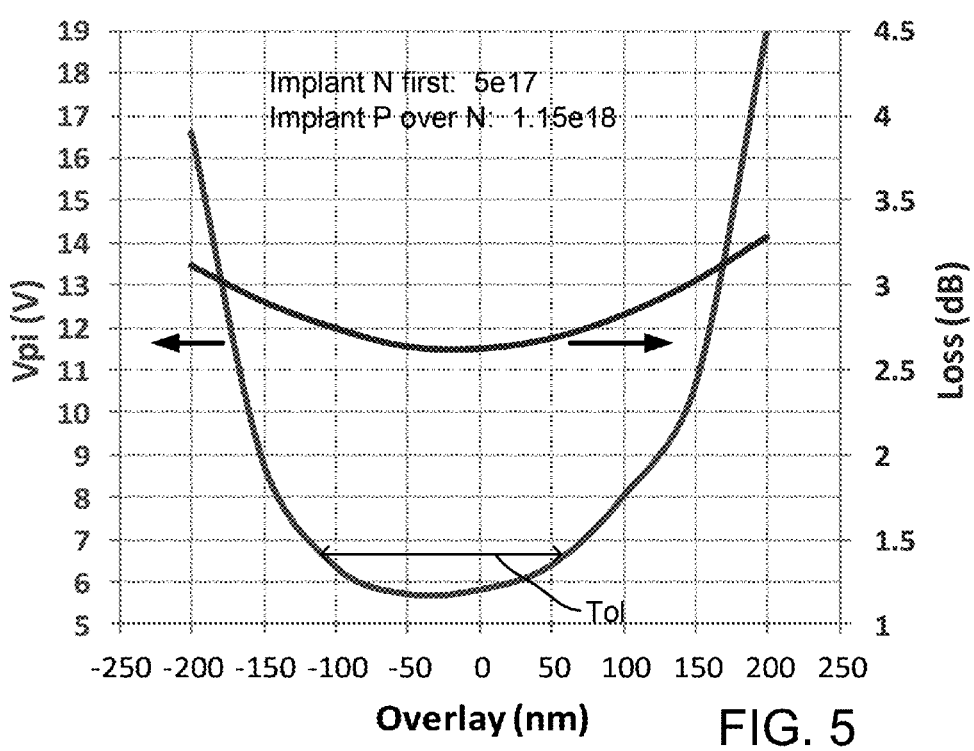
FIG. 5 shows distributions of π-phase shift voltage Vpi and transmission loss of a self-aligned Mach-Zehnder Interferometer versus misalignment overlay according to a second specific embodiment of the present invention.
Figure 6A:
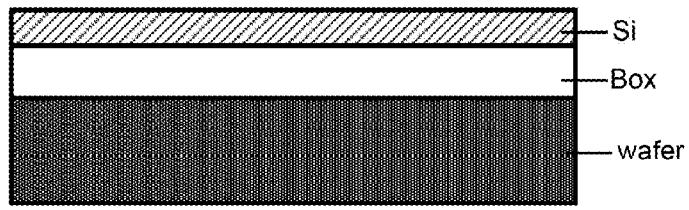
FIGS. 6A-6J show a method for forming a waveguide of a self-aligned Mach-Zehnder Interferometer according to an embodiment of the present invention.
Figure 6B:
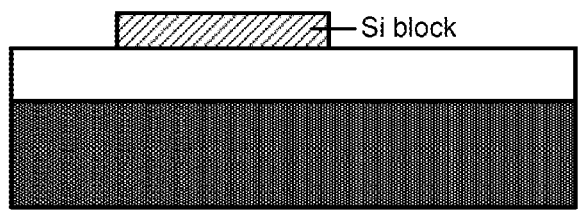
Figure 6C:
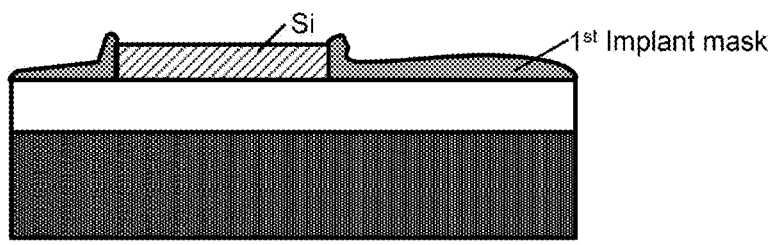
Figure 6D:
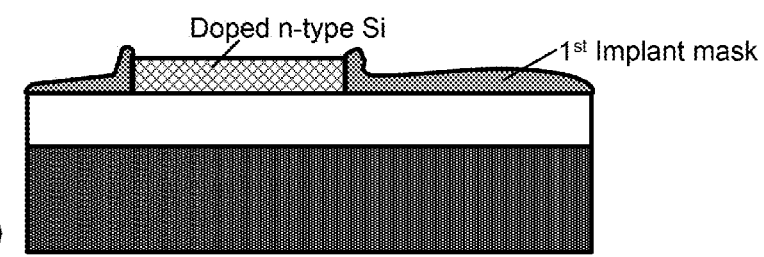
Figure 6E:
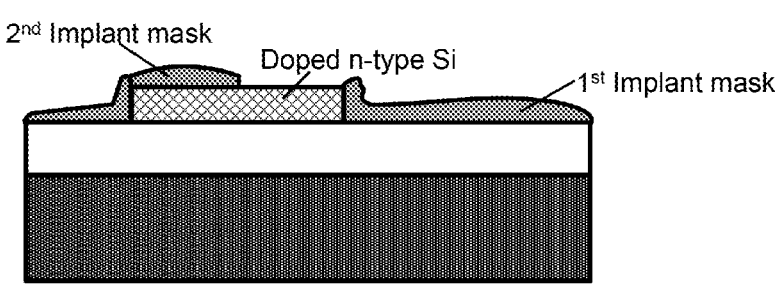
Figure 6F:
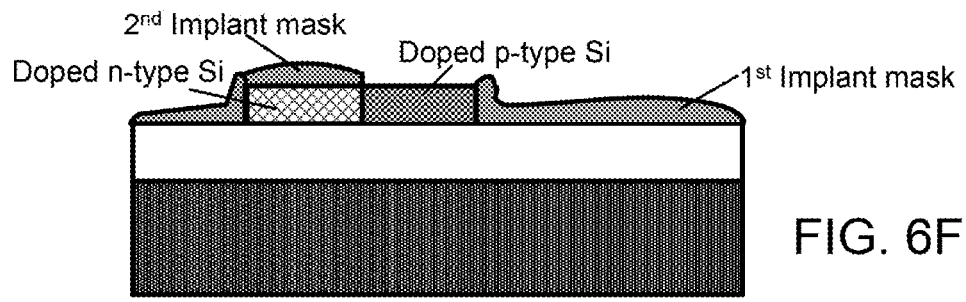
Figure 6G:
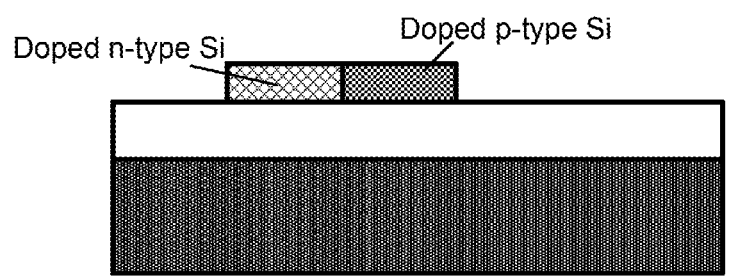
Figure 6H:
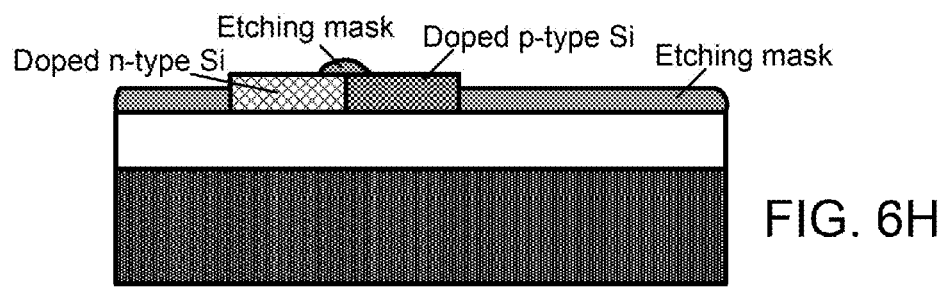
Figure 6I:
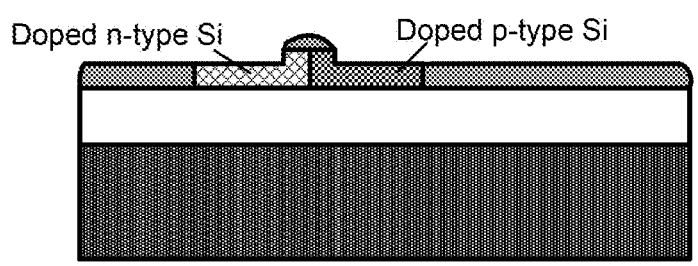
Figure 6J:
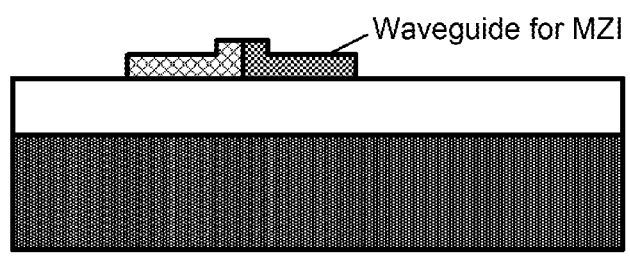

FIG. 5 shows distributions of π-phase shift voltage Vpi and transmission loss of a Mach-Zehnder Interferometer versus misalignment overlay according to a second specific embodiment of the present invention. In this example, the same improved process is employed to use two and overlapped implant masks for sequentially forming p and n-type semiconducting regions with self-aligned single boundary. The only difference is to first perform n-type impurity implantation via the first mask up to $5 \times 10^{17}$ cm$^{-3}$ dopant concentration followed by secondly performing p-type impurity implantation via the second mask up to $1.15 \times 10^{18}$ cm$^{-3}$ dopant concentration. As shown, the margin of tolerance (Tol) is roughly the same up to 180 nm and again the minimum Vpi corresponds to a negatively-shifted misalignment overlay at about −40 nm. But the MZI transmission loss distribution is more balanced in terms of negative-positive shift direction of the misalignment overlay.

In an alternative embodiment, the present disclosure provides a method for manufacturing a waveguide for forming a Mach-Zehnder interferometer (MZI). In one example, FIGS. 6A-6J show a method with key processes for forming a waveguide of a self-aligned Mach-Zehnder Interferometer. Of course, some processes therein can be performed in different order and some additional processes can be includes without limiting the claimed scope and one or more processes may be deleted as an alternative method without affecting the claimed scope. As shown, in process (A), a silicon-on-insulator substrate is provided with a Silicon layer (of a first thickness) overlying a BOX insulator layer on a Silicon wafer substrate. In process (B), which may include multiple steps in patterning, masking, and etching, a shaped Silicon block is formed as a base-block for forming a Si waveguide. Usually the shaped Silicon block is in an elongated rectangular shape with a length, a width, and a thickness (which can be still the first thickness of the original Silicon layer.

Further, in process (C), a first implant mask is placed around the Silicon block such as the desired waveguide area is fully exposed and rest areas are covered. In process (D), a first implantation is performed so that an n-type impurity (this is merely an example as a p-type impurity) is implanted into the Silicon block through the opening of the first implant mask. In particular, the implantation is controlled such that the n-type impurity atoms can be doped substantially uniform down to full thickness, i.e., the first thickness, of the Silicon block. The dopant concentration can be controlled, for example, at a first concentration such as $5 \times 10^{17}$ cm$^{-3}$ or others.

Furthermore, the method provides another process (E), a second implant mask is disposed to cover only half portion of the Silicon block or expose the other half portion. Naturally, the second implant mask introduces a boundary line laid near a central line of the Silicon block. This process is relatively flexible in limiting the location of the boundary line so that it may be shifted due to misalignment to certain allowed distances away from the central line without affecting the result of final depletion region width of a PN junction formed thereof. The allowed distance is a so-called margin of tolerance or an allowable range of misalignment overlay relative to the central line in this specification. As shown in FIG. 4 and FIG. 5, the margin of tolerance can be as large as 180 nm for a MZI waveguide with 11 µm width. Because of the large margin of tolerance achieved and no structural nature of a single boundary line is changed by the masking boundary shift, this MZI waveguide is considered to be a self-aligned MZI waveguide.

In process (F), a second implantation is performed so that a p-type impurity (which is opposite in polarity versus the first implantation) is implanted into the exposed half portion of the Silicon block through the opening of the second implant mask. This half is overlapped with part of the opening of the first implant mask. In particular, the second implantation is controlled such that the p-type impurity atoms can be doped substantially uniform down to full thickness, i.e., again the first thickness, of the Silicon block. Additionally, the second implantation is controlled such that the dopant concentration can be controlled at a second concentration higher than the first concentration. For example, the second concentration is controlled to be, more than twice of the first concentration, at $1.15 \times 10^{18}$ cm$^{-3}$ or higher. Because of higher second concentration, after a partial recombination of the p-type impurity doped in the second implantation and the n-type impurity doped in the first implantation within this overlapped portion of the Silicon block, a net impurity concentration can be obtained as a difference of the second concentration minus the first concentration and it remains as a p-type characteristic. The boundary line of the second implant mask is substantially translated to a boundary line between a n-type semiconducting phase in original half portion of the Silicon block that is done only by the first implantation and a p-type semiconducting phase in next half portion of the Silicon block that goes through both the first and the second implantations. In process (G), after removing the implant masks, a Silicon waveguide associated with a PN junction having its boundary line lying in the middle somewhere with a margin of tolerance is formed.

In process (H), optionally, the Si waveguide formed in process (G) can be further reconfigured. In this example, an etching mask is patterned and disposed to cover a partial portion of the Silicon waveguide such that a first width of middle portion containing the boundary line is covered while exposing two side regions of the Silicon waveguide. Optionally, the first width is allowable to shift slightly without limiting its central line to be at the boundary line or at the central line of the previously-formed Silicon waveguide. In process (I), the two side regions are etched to remove partial portion of Silicon material so that the first thickness in the two side regions is reduced to a second thickness. In process (J), the etching mask is removed. A reconfigured Silicon waveguide is formed, which is designated to confine optical waves transmitted thereto to be substantially within the portion having the first width and the first thickness along the original length as one arm of a Mach-Zehnder interferometer.

Figure 7:
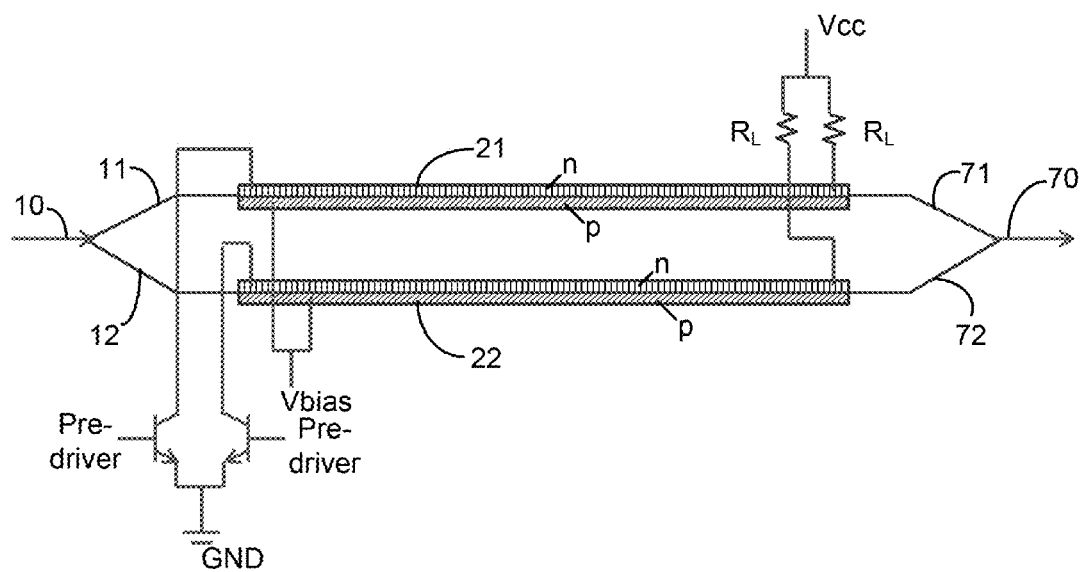
FIG. 7 shows a circuit diagram of a Mach-Zehnder modulator according to an embodiment of the present invention.

In some embodiments, the self-aligned Mach-Zehnder interferometer is implemented in a circuit of Mach-Zehnder modulator for providing optical signal modulation based on one or more preset modulation format. FIG. 7 shows a circuit diagram of a Mach-Zehnder modulator according to an embodiment of the present invention. Referring to FIG. 7, an optical input signal 10 is launched into a first directional splitter. The power of the input laser signal 10 is split into the two optical paths 11 and 12 with a splitting ratio that can be adjustable. Optical waves carried in the two optical paths travel through two waveguides 21, 22 made by a self-aligned Mach-Zehnder interferometer based on Si material with a p-n junction. An electrode on p-impurity region of each p-n junction in two waveguides 21 and 22 is commonly under a bias voltage Vbias. The two electrodes on n-impurity regions are respectively subjected to a pair of pre-drivers controlled via a current source (not explicitly shown) coupled to ground level GND. Across one or both the p-n functions, free carriers can be injected by applying an electric field to modify the refractive index in the waveguide material along the whole length of waveguide 21 or 22, and, thus, modify the signal amplitude for the traveling wave through each path, forming a differential structure of a MZ modulator.

In an embodiment, both n-ports of waveguides 21, 22 are coupled in parallel to a DC current source receiving a modulation electric field (called RF voltage or Vcc). For example, the electrode of n-impurity region of each waveguide 21 or 22 receives the Vcc voltage that drives a current flowing through the entire MZ interferometer with a current set by the DC current source and Vcc. Each current path is coupled with a resistor RL. The DC bias voltage $V_{bias}$ is applied to the p-impurity region to tune two respective "RF" electrical signals concentrated between the respective two electrodes of each waveguide, where "RF" electrical modulation signal interacts on the corresponding optical signal in each path with a "differential" structure associated with the two waveguides for producing modulation effect for the input signal. The two traveling waves respectively outputted to branch 61 and 62 are then combined into one fiber to yield a modulated output signal 70 due to the free-carrier injection-induced phase interference between the two traveling waves.

Figure 8:
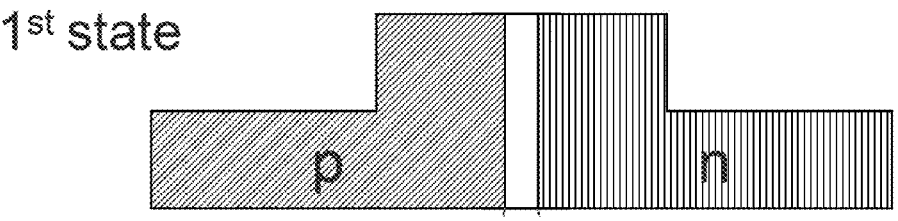
FIG. 8 is schematic diagram showing on-off keying modulation format using the self-aligned Mach-Zehnder Interferometer according to an embodiment of the present invention.
Figure 8:
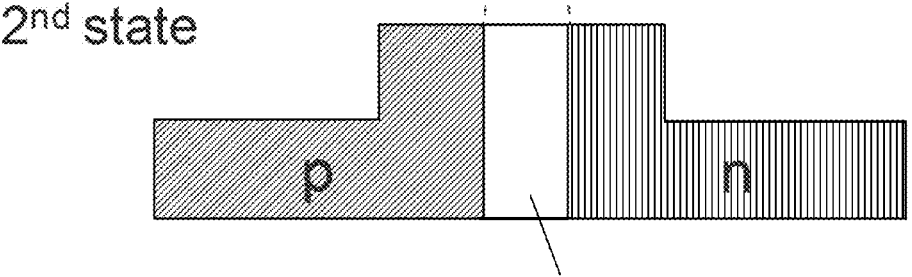

FIG. 8 is schematic diagram showing on-off keying modulation format using a pair of self-aligned Mach-Zehnder Interferometers according to an embodiment of the present invention. In a specific embodiment, the MZ modulator using a pair of self-aligned Mach-Zehnder Interferometers is implemented in telecommunication with a standard non-return-to-zero (NRZ) line code which is a binary code in which "1" s are represented by one significant condition (usually a positive voltage) and "0" s are represented by some other significant condition (usually a negative voltage), with no other neutral or rest condition. In other words, an on-off keying modulation format is provided. As seen below, this on-off keying format is achieved by adjusting the depletion region of the PN junction by the Vbias.

In an embodiment, for the PN junction in the waveguide forming the MZ interferometer, a p-impurity region of the PN junction comprises a concentration ranging from $3 \times 10^{17}$/cm$^3$ to $1 \times 10^{18}$/cm$^3$ provided in a first region of the ridge structure of the waveguide (see FIG. 2A or FIG. 2B). An n-impurity region of the PN junction comprises a concentration ranging from $3 \times 10^{17}$/cm$^3$ to $1 \times 10^{18}$/cm$^3$ provided in a second region of the ridge structure. A depletion region is formed between the p-impurity region and the n-impurity region, which has a first state and a second state in terms of depletion region width. For example, the depletion region has a first narrow width ranging from 30 nm to 90 nm in the first state and extending from an upper surface to a bottom surface region of the waveguide, and the depletion region has a second narrow width of 150-300 nm in the second state, and extending from the upper surface to the bottom surface of the waveguide.

In some embodiments, due to manufacture process variation and other changes in environment conditions and material conditions, a first variation is provided by the first narrow width during the first state and a second variation is provided by the second narrow width during the second state.

In some embodiments, a first refractive index characterizing the depletion region in the first state is given based on the first narrow width; and a second refractive index characterizing the depletion region in the second state is given based on the second narrow width. Here the first state is different from the second state by a ratio of $1\times10^{-5}$.

In some embodiments, a bias voltage applied between the electrode of the p-impurity region and the electrode of the n-impurity region of each PN junction waveguide (21 or 22). The voltage ranges from 0 to 10V to form the depletion region in the first state and increasing a size of the depletion region from the first narrow width to the second narrow width in a linear manner dependent on a magnitude of the voltage applied between the first electrode and the second electrode.

Figure 9:
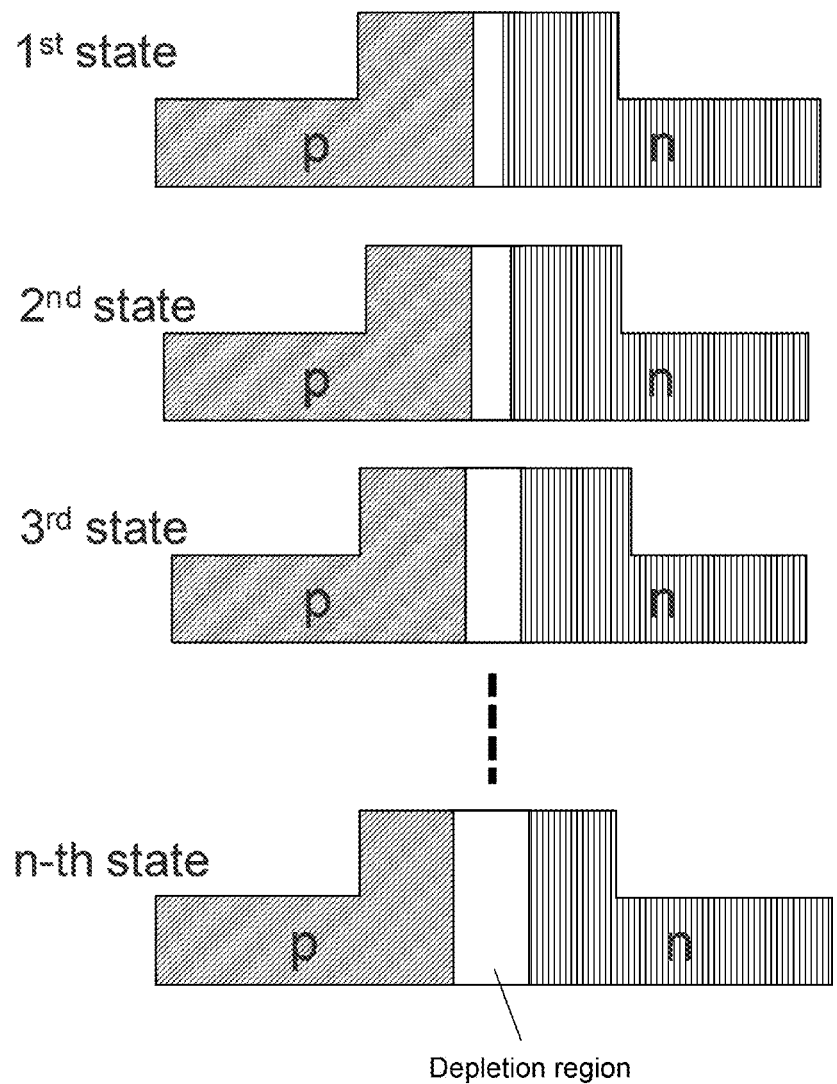
FIG. 9 is schematic diagram showing advanced modulation format using the self-aligned Mach-Zehnder Interferometer according to an embodiment of the present invention.

In some embodiments, advanced modulation format can be provided through the same MZ interferometer-based MZ modulator by fine tuning the depletion region in more detailed manner. FIG. 9 is schematic diagram showing advanced modulation format using the self-aligned Mach-Zehnder Interferometer according to an embodiment of the present invention. Referring to FIG. 9, the first state is associated with a first width of the depletion region of the PN junction formed in each waveguide, the second state corresponds to a second width, the third state corresponds to a third width, . . . , the n-th state corresponds to a n-th width, and so on. Each width of the depletion region, still can be tuned by the bias voltage applied to the PN junction. The various combination of the first through n-th state of the wave guide based on the self-aligned MZ interferometer thus provides different mode of modulation to the optical waves passing through the two optical paths of the MZ modulator (see FIG. 7). For example, for PAM4 modulation format, 4-level of states are needed to be generated with 4 different depletion widths controlled by the DC current/RF voltage driver by setting n=4 in the MZ modulator.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of forming a waveguide for a self-aligned Mach-Zehnder Interferometer comprising:
    forming a waveguide having a length on a substrate, the waveguide including a first portion having a first thickness and a first width, and a pair of second portions each having a second thickness and a second width naturally extended beyond the first width towards one of two opposite directions;
    providing a first mask with a first opening exposing the waveguide entirely across the first width and the pair of second widths;
    doping a first electrical dopant of a first concentration through the first opening into the waveguide down to the first thickness of the first portion of the waveguide and the second thickness of each of the pair of second portions to form a first semiconducting phase thereof;
    providing a second mask with a second opening exposing only part of the waveguide including a partial first portion connected to one second portion, the second opening having a same length as the first opening;
    doping a second electrical dopant of a second concentration through the second opening into the part of the waveguide down to the first thickness of the partial first portion and the second thickness of the one second portion to form a second semiconductor phase thereof sharing a boundary with the first semiconducting phase, the second electrical dopant being opposite in polarity versus the first electrical dopant, the second concentration being greater than the first concentration;
    having a partial recombination between the first electrical dopant of the first concentration and the second electrical dopant of the second concentration commonly existed throughout the first thickness of the partial first portion and the second thickness of the one second portion, thereby forming a third semiconducting phase thereof sharing the same boundary with the first semiconducting phase.

2. The method of claim 1 wherein the waveguide is a Silicon or Silicon-Nitride waveguide formed in a silicon-on-insulator substrate.

3. The method of claim 2 further comprising forming an etching mask to cover the first portion of the first width; performing etching to remove partially the pair of second portions to make the second thickness smaller than the first thickness.

4. The method of claim 3 wherein the waveguide is configured to have an optical wave being confined primarily within the first portion of the first width and the first thickness.

5. The method of claim 2 wherein the first width is in a range of 0.4 μm to 0.6 μm and the second width is in a range of 1.5 μm to 50 μm.

6. The method of claim 1 wherein providing a first mask comprises forming the first opening no smaller in width than the first width plus the pair of second widths.

7. The method of claim 1 wherein providing a second mask comprises forming a boundary edge of the second opening within a range of the first width with a tolerance of variation about 180 nm or greater, the boundary edge being translated to the boundary between the first semiconducting phase and the third semiconducting phase.

8. The method of claim 7 wherein doping the first electrical dopant comprises implanting an n-type dopant of the first concentration into the waveguide to make the first semiconducting phase an n-type phase with a dopant concentration equal to the first concentration retained in a remaining partial first portion and the opposite one second portion of the waveguide, and doping the second electrical dopant comprises implanting a p-type dopant of the second concentration into the partial first portion and the one second portion of the waveguide to make the second semiconducting phase a p-type phase mixed with the n-type phase formed previously.

9. The method of claim 8 wherein having a partial recombination comprises forming the third semiconducting phase as a p-type phase with a net dopant concentration in the partial first portion and the one second portion of the waveguide equal to a difference between the second concentration and the first concentration, and forming a PN junction crossing the same boundary with respect to the first semiconducting phase as an n-type phase.

10. The method of claim 1 wherein the second concentration is at least two times greater than the first concentration.

11. A method for manufacturing one arm of a self-aligned Mach-Zehnder modulator, the method comprising:
providing a silicon-on-insulator substrate;
forming a first block of a length, a width, and a first thickness in the silicon-on-insulator substrate;
providing a first mask on the first block, the first mask comprising a first opening area exposing the entire width of the first block from a first edge to a second edge;
doping a first impurity to a first concentration through the first opening area into the first thickness of the first block to convert the entire first block to be a first semiconducting phase with a first doping polarity;
providing a second mask on the first block, the second mask having a second opening area overlapping with substantially half of the first opening area having the second edge, the second mask having a boundary edge marginally varied around a central line of the width;
doping a second impurity to a second concentration through the second opening area to convert substantially half portion of the first block to a second semiconductor phase with a second doping polarity opposite to the first doping polarity, the boundary edge being translated to a boundary line between the second semiconductor phase and the first semiconductor phase in remaining half portion of the first block;
forming an etching mask to cover a first width around the boundary line but to expose a first region and a second region of the first block extended beyond the first width respectively towards the first edge and the second edge;
etching partially the first region and the second region to reduce the first thickness thereof to a second thickness while keeping the first thickness within the first width.

12. The method of claim 11 wherein forming a first block comprises patterning, masking, and etching a part of a Silicon layer in the silicon-on-insulator substrate substantially in an elongated rectangular shape of the length about 3 mm and the width of about 10-100 µm.

13. The method of claim 11 wherein doping a first impurity comprises implanting an n-type dopant up to the first concentration into the first thickness of the first block to so that the first semiconducting phase thereof is n-type with a dopant concentration being equal to the first concentration.

14. The method of claim 13 wherein doping a second impurity comprises implanting a p-type dopant up to the second concentration into the first thickness of the substantially half portion of the first block under the second opening area so that the second semiconducting phase thereof is p-type with a dopant concentration being equal to a difference between the second concentration and the first concentration, the second concentration is higher than the first concentration.

15. The method of claim 14 wherein the second concentration is at least twice of the first concentration.

16. The method of claim 14 wherein the second semiconducting phase is formed after a partial combination of the p-type dopant with the n-type dopant of the first semiconducting phase takes place in the half portion of the first block under the second opening area, the second semiconducting phase and the first semiconducting phase in the remaining half portion of the first block form a PN junction across the boundary line.

17. The method of claim 11 wherein forming an etching mask to cover a first width around the central line comprises disposing the etching mask at least over the boundary line such that a central line of the first width is marginally shifted away relative to the boundary line.

18. The method of claim 17 wherein etching partially the first region and the second region beyond the first width comprises forming a waveguide for substantially confining optical wave within the first width and the first thickness.

19. The method of claim 11 wherein first block comprises a Silicon Nitride layer formed on in the silicon-on-insulator substrate.

20. The method of claim 11 wherein doping a first impurity comprises implanting a p-type dopant up to the first concentration into the first thickness of the first block and doping a second impurity comprises implanting an n-type dopant up to the second concentration into the first thickness of a substantially half portion of the first block under the second opening area.

* * * * *